Feb. 21, 1928.

C. Y. KNIGHT 1,659,979

DEVICE FOR HOLDING PISTON PINS TIGHT

Original Filed Feb. 5, 1923

INVENTOR

Charles Y. Knight

BY

Chester H. Bradford

ATTORNEY

Patented Feb. 21, 1928.

1,659,979

UNITED STATES PATENT OFFICE.

CHARLES Y. KNIGHT, OF PASADENA, CALIFORNIA, ASSIGNOR TO KNIGHT & KILBOURNE DEVELOPMENT CO., OF CHICAGO, ILLINOIS, A CORPORATION OF ILLINOIS.

DEVICE FOR HOLDING PISTON PINS TIGHT.

Application filed February 5, 1923, Serial No. 616,927. Renewed July 18, 1927.

This invention relates to a device for holding a piston pin tight during all operations to thereby eliminate any possible noise which might occur from a slight wear.

It is an object of the invention therefore to provide means for exerting pressure between the gudgeon pin in a piston assembly and the bearing trunnions in the piston.

A further object of the present invention relates to a method of construction and assembly of a piston provided with means for exerting pressure and predetermining the pressure between the wrist or gudgeon pin and the bearings thereof in the piston.

A further object of the present invention relates to a device of the character described which may be adjusted after use to compensate or take up for any possible wear which may occur.

A further object of the present invention relates to means for locking the pressure applying means between the trunnion bearings and the wrist pin so that a continuous predetermined pressure may be maintained throughout an extended period in use.

Various other objects are within the scope of this invention such as relate to the arrangement of the related elements of the structure; to various details of construction; to economies of manufacture; and to each of the other features of novelty as will appear from a consideration of the details of the drawing and related description of a certain form of the invention which may be preferred in which drawings.

Figure 1:
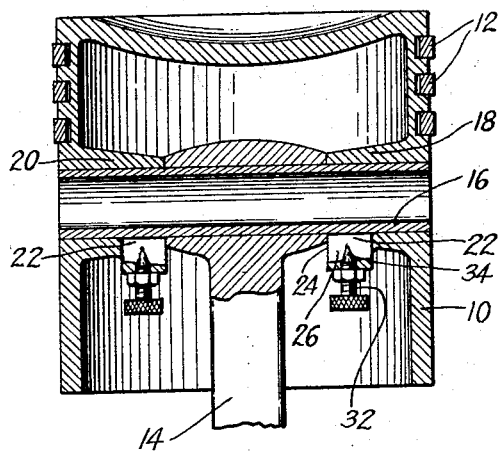
Figure 1 is a vertical sectional view through the piston assembly.
Figure 2:
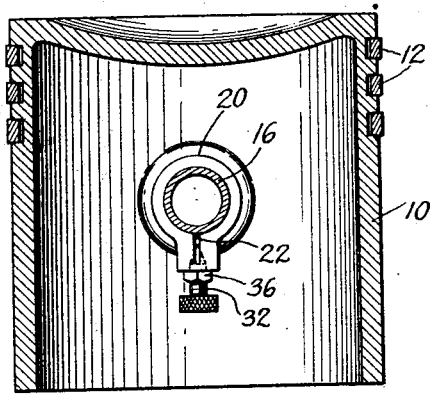
Figure 2 is a transverse sectional view taken at right angles to Figure 1.

Referring to Figure 1, in which the piston 10 is illustrated as provided with the usual piston rings 12 and the piston rod 14 is connected thereto through the gudgeon pin 16 made in tubular form for lightness, being supported in the trunnions 18 and 20 as shown.

The bearings 18 and 20 are each provided with longitudinal slots or cutaway portions 22 shown in the present instance to extend from the inside surface 24 of the bearing outwardly about half the depth of the bearing, the bottom surface of the kerf or slot being inclined as shown at 26. This cutaway portion will permit the inner edges of the trunnions to be spread and the resiliency of the material will tend to return this portion of the bearing to normal position and it is upon this action that I depend for securing my piston pin holding means and wear compensating device.

Suitable means for spreading the inner portion of the trunnions consists in providing the trunnion with a conical seat 28, with a screw-threaded opening 30 entering same from the interior of the bearing, the conical seat terminating in the base 26 of the slot 24. (See Figures 1, 4, 5 and 6). A pointed set screw 32 is screw-threaded as shown into the opening 30, in the bearing, and has a conical end 34 adapted to coact with the conical surface 28 as will hereinafter appear, to adjust the spread of the inner portion of the bearing. A screw-threaded lock nut 36 holds the set-screw 32 in any position of adjustment as will be understood by those skilled in the art.

Figure 3:
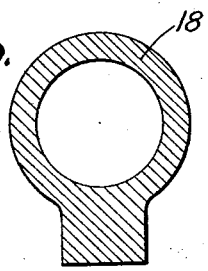
Figures 3, 4, 5 and 6 are sectional views through the bearing between the piston trunnions and the gudgeon pin illustrating the method of construction and assembly in providing the pressure and wear compensating device.
Figure 4:
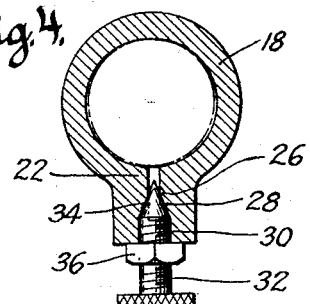
Figure 5:
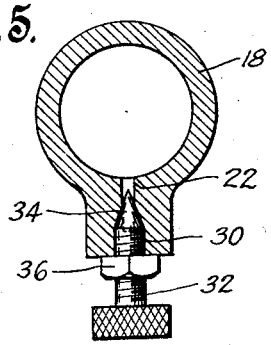
Figure 6:
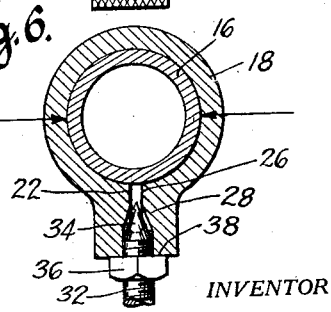

The method forming a part of the present invention whereby the parts are assembled to provide a suitable device for the purposes intended and the convenient method of insuring proper fit and operation of the parts of the piston and piston rod assembly consists in first providing the trunnions 18 and 20 shown in Figure 3 with the transverse kerf 22 as shown in Figure 4 and boring the same to size. The bearings are then provided or may have been theretofore provided with the conical seat 28 and threaded opening 30. The set screw 30 is then inserted the full amount and the bearing is spread to a certain extent without excessive straining the material of the bearings. The trunnions are then reamed to size and the set screw backed slightly off to permit the walls to spring or close back still further to a sufficient amount to properly hug the piston or gudgeon pin 16 after the same has been inserted therein as shown in Figure 6. The lock nut 36 is then screwed tight against the flat bottom surface 38 of the bearing. When the piston is first assembled on the piston rod the conical end 34 of the set-screw 32 still exerts considerable pressure so that the hugging action of the end of the bearing may be later increased by further backing-off the spreading pressure of the set-screw 30 to take up for any wear after the piston has been used.

It is apparent that within the spirit of the invention modifications and different arrangements may be made other than as herein disclosed, and the present disclosure is illustrative merely, the invention comprehending all variations illustrated.

Having thus described my invention, what I desire to secure by United States Letters Patent and claim is:

1. In a device of the class described including a piston, a piston rod, a gudgeon pin for connecting the piston rod to the piston, adjustable bearings in the piston to rotatably support said gudgeon pin, said bearings having a normal diameter less than that of the pin, and means associated with said bearings for adjusting the diameter of the bearing to that of the pin.

2. In a piston and piston rod assembly, a piston, a piston rod, a wrist pin secured to said rod, trunnions in said piston for movably supporting said wrist pin, a slot in said trunnions and means to spread said trunnions and release said spread in order to permit said trunnions to exert a pressure around said wrist pin.

3. The method of assembling a piston and piston rod connection of the character described which consists in boring the trunnions of the piston which support the gudgeon pin forming a radial slot in the inner wall of the trunnion, inserting a spreading means in said slot, reaming said trunnions to size, assembling said piston, piston rod and gudgeon pin in said trunnions and releasing said spreading means to the desired amount.

4. In a piston and piston rod assembly having a piston rod gudgeon pin and piston trunnions, means inherent in said trunnions for applying pressure to the piston gudgeon pin; means for relieving or increasing the trunnion pressure on the pin; and means to lock said pressure applying means in a predetermined position.

5. In a piston and piston rod assembly, single adjustable means to apply release pressure to the piston gudgeon pin by the trunnions and means to lock said last mentioned means in a predetermined position.

6. In a cooperating bearing assembly, the combination of a socket member having a bearing surface having a normal predetermined curvature; and a coacting bearing element adapted to engage said surface; and means including a pin movable in and having wedging engagement with the walls of a slot formed in said bearing surface but not extending through said socket member adapted to vary the curvature of the surface to correspond to that of the element.

7. That method of assemblying cooperating pin and socket members which consists in drilling the socket to form a bearing having a diameter less than the approximate side of the pin; slotting a portion of said bearing; inserting a spreading means in said slot to diminish the curvature of the bearing; reaming the socket to the size of the pin; assembling the pin in said socket; and releasing the spreading means of the socket until the curvature thereof corresponds to that of the pin.

8. In a piston and piston rod assembly, the combination of a piston; a piston rod; a wrist pin secured to said rod; trunnions in said piston for movably supporting said wrist pin; and means for exerting uniform pressure by the trunnions on said pin, said means comprising wedging mechanism adapted to have movement in a slot formed in the wall of the trunnions to vary the size thereof in accordance with the size of the pin; and means for varying the position of said wedge.

9. In cooperating bearing assembly, the combination of a socket member having a slot extending part way into the inner wall thereof; a wedge member positioned in said socket slot and adapted to have movement therein to vary the curvature of the socket wall; a pin adapted to have cooperative engagement with said socket, the normal curvature of the pin being greater than that of the socket, and the curvature of the socket being adjustable to fit that of the pin.

10. In a cooperating bearing assembly, a bearing element; a socket member for rotatably supporting said element having a slot in the bearing surface thereof; and means to distort said socket member about the base of said slot, said means acting in the plane of said slot, whereby the bearing surface of said socket member may be adjusted to conform to said bearing element.

In testimony whereof, I affix my signature.

CHARLES Y. KNIGHT.